US006364836B1

United States Patent
Fukukita et al.

(10) Patent No.: US 6,364,836 B1
(45) Date of Patent: Apr. 2, 2002

(54) ULTRASOUND DIAGNOSTIC APPARATUS

(75) Inventors: Hiroshi Fukukita, Tokyo; Morio Nishigaki, Fujisawa; Hisashi Hagiwara, Yokohama, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/634,857

(22) Filed: Aug. 8, 2000

(30) Foreign Application Priority Data

Jan. 19, 2000 (JP) ........................................ 2000-014068

(51) Int. Cl.⁷ ................................................ A61B 8/00
(52) U.S. Cl. .................................................... 600/443
(58) Field of Search ........................... 600/443, 444, 600/447, 448, 449, 437; 128/916

(56) References Cited

U.S. PATENT DOCUMENTS 5,419,330 A * 5/1995 Nishigaki et al. .......... 600/437
5,555,534 A   9/1996 Maslak et al.
6,063,033 A * 5/2000 Haider et al. ............... 600/447
6,123,671 A * 9/2000 Miller ......................... 600/447
6,139,501 A * 10/2000 Roundhill et al. .......... 600/443

FOREIGN PATENT DOCUMENTS

WO   WO96/04588   2/1996

* cited by examiner

Primary Examiner—Francis J. Jaworski
Assistant Examiner—Maulin Patel
(74) Attorney, Agent, or Firm—Louis Woo

(57) ABSTRACT

An ultrasound diagnostic apparatus includes a probe which outputs RF signals. There are N phase detectors for converting the RF signals outputted from the probe into baseband signals In and Qn, where "N" denotes a first predetermined natural number and "n" denotes a second predetermined natural number set as $2 \leq n \leq N$. A reception beam former operates for processing the baseband signals In and Qn into a time-division-multiplexed signal. The reception beam former includes a device for multiplying the baseband signals In and Qn by phase shift data to generate multiplication-resultant signals, a device for delaying the multiplication-resultant signals to generate delay-resultant signals, and a device for combining the delay-resultant signals into the time-division-multiplexed signal.

13 Claims, 3 Drawing Sheets

FIG. 3

| TIME | MULTIPLIER | | | | BEAM FORMER OUTPUT | | | | PHASE DETECTOR 6 | |
|---|---|---|---|---|---|---|---|---|---|---|
| | M5 | | M6 | | | M9 | M10 | | I OUTOUT | Q OUTPUT |
| t=iT | INPUT | PH1 | INPUT | PH2 | RELATED COMPONENTS IN IQm | C | S | | RELATED COMPONENTS | RELATED COMPONENTS |
| 1T | I1(1) | C1 | Q1(1) | −S1 | I1(1)·C1−Q1(1)·S1 | 1 | 0 | | I1(1)·C1−Q1(1)·S1 | 0 |
| 2T | I1(1) | S1 | Q1(1) | C1 | I1(1)·S1+Q1(1)·C1 | 0 | 1 | | 0 | I1(1)·S1+Q1(1)·C1 |
| 3T | I1(3) | C1 | Q1(3) | −S1 | I1(3)·C1−Q1(3)·S1 | 1 | 0 | | I1(3)·C1−Q1(3)·S1 | 0 |
| 4T | I1(3) | S1 | Q1(3) | C1 | I1(3)·S1+Q1(3)·C1 | 0 | 1 | | 0 | I1(3)·S1+Q1(3)·C1 |
| 5T | I1(5) | C1 | Q1(5) | −S1 | I1(5)·C1−Q1(5)·S1 | 1 | 0 | | I1(5)·C1−Q1(5)·S1 | 0 |

FIG. 4

| TIME | MULTIPLIER | | | | BEAM FORMER OUTPUT | | | | PHASE DETECTOR 6 | |
|---|---|---|---|---|---|---|---|---|---|---|
| | M5 | | M6 | | | M9 | M10 | | I OUTOUT | Q OUTPUT |
| t=iT | INPUT | PH1 | INPUT | PH2 | RELATED COMPONENTS IN IQm | C | S | | RELATED COMPONENTS | RELATED COMPONENTS |
| 1T | I1(1) | C1 | Q1(1) | −S1 | I1(1)·C1−Q1(1)·S1 | 1 | 0 | | I1(1)·C1−Q1(1)·S1 | 0 |
| 2T | I1(1) | S1 | Q1(1) | C1 | I1(1)·S1+Q1(1)·C1 | 0 | 1 | | 0 | I1(1)·S1+Q1(1)·C1 |
| 3T | −I1(3) | −C1 | Q1(3) | +S1 | −I1(3)·C1+Q1(3)·S1 | −1 | 0 | | I1(3)·C1−Q1(3)·S1 | 0 |
| 4T | −I1(3) | −S1 | Q1(3) | −C1 | −I1(3)·S1−Q1(3)·C1 | 0 | −1 | | 0 | I1(3)·S1+Q1(3)·C1 |
| 5T | I1(5) | C1 | Q1(5) | −S1 | I1(5)·C1−Q1(5)·S1 | 1 | 0 | | I1(5)·C1−Q1(5)·S1 | 0 |

ULTRASOUND DIAGNOSTIC APPARATUS

BACKGROUND OF THE INVENTION

1. Field of the Invention

This invention relates to an ultrasound diagnostic apparatus which can operate in any one of different modes including a Doppler-based mode using steerable continuous wave (SCW).

2. Description of the Related Art

U.S. Pat. No. 5,555,534 corresponding to PCT application WO96/04588 discloses an ultrasonic receive system including first and second separate receive beamformers. The first receive beamformer is optimized for imaging modes such as B-mode and color Doppler flow imaging, and therefore has high spatial resolution and wide bandwidth. The second receive beamformer has a wide dynamic range and is dedicated for use in acquiring spectral Doppler information, which is typically narrowband compared to imaging information. The second receive beamformer achieves the sensitivity and low-noise performance of a dedicated single-channel pencil probe instrument. The second receive beamformer also performs electronic beam steering. Both the first and second receive beamformers can operate through a common transducer array, thereby increasing exam efficiency and permitting registration of spectral Doppler information with a B-mode or color Doppler flow image.

The ultrasonic receive system in U.S. Pat. No. 5,555,534 can operate in any one of the B-mode, the color Doppler mode, the beam-steering Doppler mode. During the B-mode or the color Doppler mode of operation, the first receive beamformer is used. During the beam-steering Doppler mode of operation, the second receive beamformer is used. The ultrasonic receive system in U.S. Pat. No. 5,555,534 has a complicated structure since the first and second receive beamformers are separate from each other.

SUMMARY OF THE INVENTION

It is an object of this invention to provide a simple ultrasound diagnostic apparatus.

A first aspect of this invention provides an ultrasound diagnostic apparatus comprising a probe outputting RF signals; N phase detectors for converting the RF signals outputted from the probe into baseband signals In and Qn, where "N" denotes a first predetermined natural number and "n" denotes a second predetermined natural number set as $2 \leq n \leq N$; and a reception beam former for processing the baseband signals In and Qn into a time-division-multiplexed signal; wherein the reception beam former comprises means for multiplying the baseband signals In and Qn by phase shift data to generate multiplication-resultant signals, means for delaying the multiplication-resultant signals to generate delay-resultant signals; and means for combining the delay-resultant signals into the time-division-multiplexed signal.

A second aspect of this invention is based on the first aspect thereof, and provides an ultrasound diagnostic apparatus further comprising means for selecting either a set of the RF signals or a set of the baseband signals In and Qn, and feeding the selected signal set to the reception beam former.

A third aspect of this invention is based on the second aspect thereof, and provides an ultrasound diagnostic apparatus wherein the multiplying means in the reception beam former comprises multipliers for multiplying the baseband signals In and Qn by the phase shift data, and the multipliers are operative for multiplying the RF signals by weighting factors when the set of the RF signals is fed to the reception beam former.

A fourth aspect of this invention is based on the first aspect thereof, and provides an ultrasound diagnostic apparatus further comprising a demodulation phase detector for subjecting the time-division-multiplexed signal to a demodulation process.

A fifth aspect of this invention is based on the fourth aspect thereof, and provides an ultrasound diagnostic apparatus wherein the demodulation phase detector comprises means for demultiplexing the time-division-multiplexed signal.

A sixth aspect of this invention is based on the first aspect thereof, and provides an ultrasound diagnostic apparatus wherein the delaying means comprises means for delaying the multiplication-resultant signals by fixed time intervals.

A seventh aspect of this invention provides an ultrasound diagnostic apparatus comprising a first transducer element (P1) outputting a first RF signal; a second transducer element (P2) outputting a second RF signal; a third transducer element (P3) outputting a third RF signal; first means (12) for demodulating the third RF signal into a baseband in-phase signal and a baseband quadrature signal; a first multiplier (M5); a second multiplier (M6); an adder (A1) connected to the first and second multipliers (M5, M6) for adding an output signal from the first multiplier (M5) and an output signal from the second multiplier (M6); second means (SW1, SW2) for selecting either a set of the first and second RF signals or a set of the baseband in-phase and quadrature signals, for feeding the first and second RF signals to the first and second multipliers (M5, M6) respectively when the set of the first and second RF signals is selected, and for feeding the baseband in-phase and quadrature signals to the first and second multipliers (M5, M6) respectively when the set of the baseband in-phase and quadrature signals is selected; third means (W1, W2) for feeding first and second weighting factors to the first and second multipliers (M5, M6) respectively when the second means (SW1, SW2) selects the set of the first and second RF signals; and fourth means (5) for feeding first and second phase shift signals to the first and second multipliers (M5, M6) respectively when the second means (SW1, SW2) selects the set of the baseband in-phase and quadrature signals; wherein the first multiplier (M5) multiplies the first RF signal and the first weighting factor and the second multiplier (M6) multiplies the second RF signal and the second weighting factor when the second means (SW1, SW2) selects the set of the first and second RF signals; and wherein the first multiplier (M5) multiplies the baseband in-phase signal and the first phase shift signal and the second multiplier (M6) multiplies the baseband quadrature signal and the second phase shift signal when the second means (SW1, SW2) selects the set of the baseband in-phase and quadrature signals.

An eighth aspect of this invention is based on the seventh aspect thereof, and provides an ultrasound diagnostic apparatus further comprising fifth means (6, 7) for demodulating an output signal from the adder (A1) into a demodulation-resultant in-phase signal and a demodulation-resultant quadrature signal when the second means (SW1, SW2) selects the set of the first and second RF signals, and for demultiplexing the output signal from the adder (A1) into a demultiplexing-resultant in-phase signal and a demultiplexing-resultant quadrature signal when the second means (SW1, SW2) selects the set of the baseband in-phase and quadrature signals.

A ninth aspect of this invention is based on the eighth aspect thereof, and provides an ultrasound diagnostic apparatus wherein the fifth means (6, 7) comprises a multiplier generator (7) for generating first and second multiplier signals; a third multiplier (M9) for multiplying the output signal from the adder (A1) and the first multiplier signal, wherein an output signal of the third multiplier (M9) is the demodulation-resultant in-phase signal when the second means (SW1, SW2) selects the set of the first and second RF signals, and the output signal of the third multiplier (M9) is the demultiplexing-resultant in-phase signal when the second means (SW1, SW2) selects the set of the baseband in-phase and quadrature signals; and a fourth multiplier (M10) for multiplying the output signal from the adder (A1) and the second multiplier signal, wherein an output signal of the fourth multiplier (M10) is the demodulation-resultant quadrature signal when the second means (SW1, SW2) selects the set of the first and second RF signals, and the output signal of the fourth multiplier (M10) is the demultiplexing-resultant quadrature signal when the second means (SW1, SW2) selects the set of the baseband in-phase and quadrature signals.

BRIEF DESCRIPTION OF THE DRAWINGS

FIG. 3 is a diagram of the contents of signals in the apparatus of FIG. 1.

FIG. 4 is a diagram of the contents of signals in a second embodiment of this invention.

DESCRIPTION OF THE PREFERRED EMBODIMENT

First Embodiment

Figure 1:
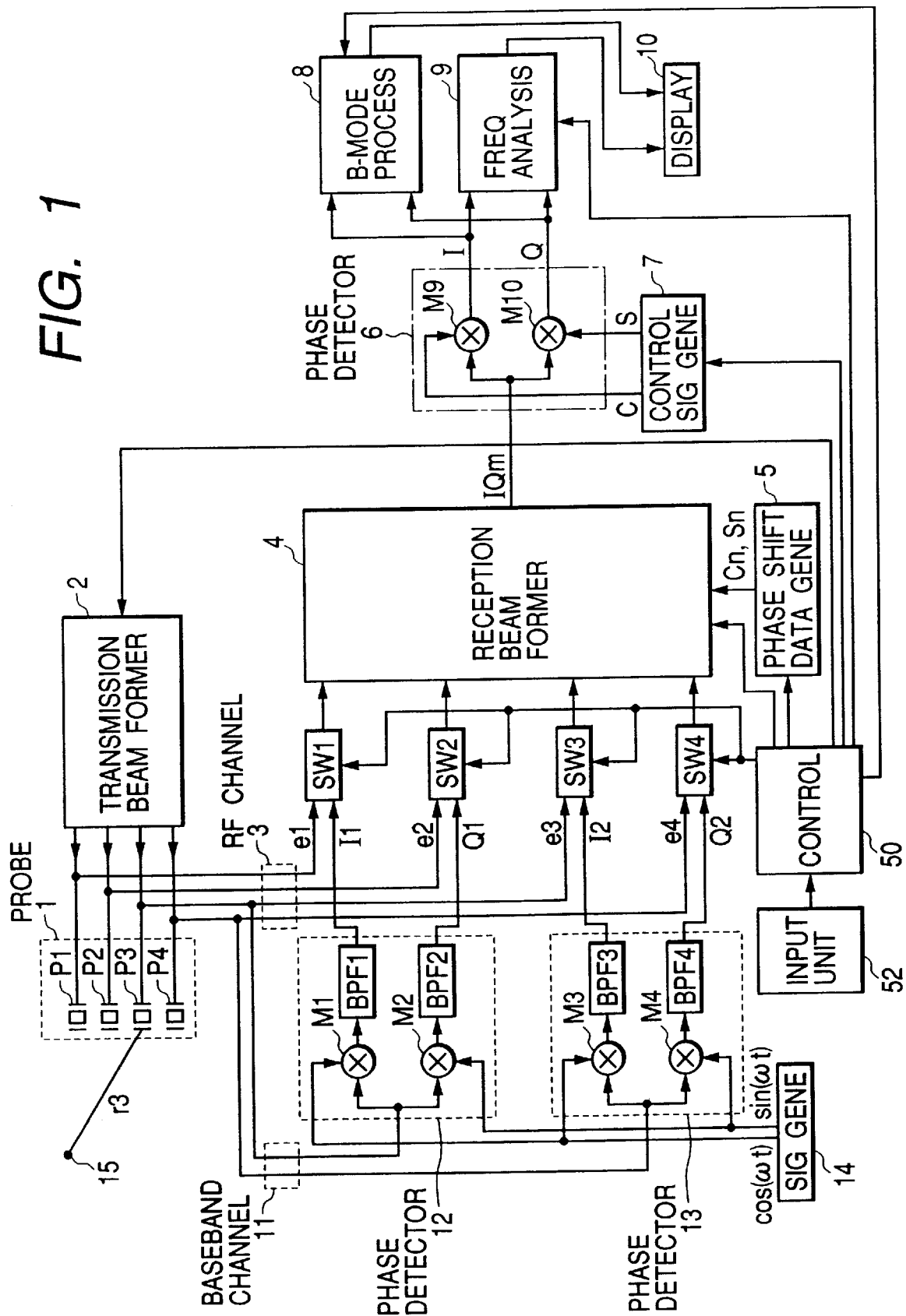
FIG. 1 is a block diagram of an ultrasound diagnostic apparatus according to a first embodiment of this invention.

FIG. 1 shows an ultrasound diagnostic apparatus according to a first embodiment of this invention. The ultrasound diagnostic apparatus of FIG. 1 includes a probe 1 for transmitting and receiving ultrasound waves into and from a body to be examined. The probe 1 has an array (for example, a linear array) of transducer elements including transducer elements P1, P2, P3, and P4.

A transmission beam former 2 is connected to the transducer elements P1, P2, P3, and P4 in the probe 1. The transmission beam former 2 generates electric pulse-wave (PW) signals or electric continuous-wave (CW) signals for driving the transducer elements P1, P2, P3, and P4. The generated electric PW or CW signals are electric radio-frequency (RF) signals. The transmission beam former 2 outputs the electric PW signals to the transducer elements P1, P2, P3, and P4, respectively. The transmission beam former 2 outputs the electric CW signals to the transducer elements P1 and P2, respectively. The transducer elements P1, P2, P3, and P4 convert the electric signals into ultrasound waves which propagate into the examined body as forward ultrasound waves, respectively. Portions of the forward ultrasound waves are reflected in the examined body before being returned to the transducer elements P1, P2, P3, and P4 as echo ultrasound waves. The transducer elements P1, P2, P3, and P4 convert the echo ultrasound waves into echo electric RF signals, respectively. The transducer elements P1, P2, P3, and P4 output the echo electric RF signals, respectively.

First input terminals of switches SW1, SW2, SW3, and SW4 are connected via an RF channel 3 to the transducer elements P1, P2, P3, and P4 in the probe 1, respectively. The RF channel 3 transmits the echo electric RF signals from the transducer elements P1, P2, P3, and P4 to the switches SW1, SW2, SW3, and SW4 respectively. Output terminals of the switches SW1, SW2, SW3, and SW4 are connected to a reception beam former 4.

A first input terminal of a phase detector 12 is connected via a baseband channel 11 to the transducer element P3 in the probe 1. A first input terminal of a phase detector 13 is connected via the baseband channel 11 to the transducer element P4 in the probe 1. The baseband channel 11 transmits the echo electric RF signals from the transducer elements P3 and P4 to the phase detectors 12 and 13 respectively. Second input terminals of the phase detectors 12 and 13 are connected to a first output terminal of a signal generator 14. Third input terminals of the phase detectors 12 and 13 are connected to a second output terminal of the signal generator 14. A first output terminal of the phase detector 12 is connected to a second input terminal of the switch SW1. A second output terminal of the phase detector 12 is connected to a second input terminal of the switch SW2. A first output terminal of the phase detector 13 is connected to a second input terminal of the switch SW3. A second output terminal of the phase detector 13 is connected to a second input terminal of the switch SW4.

The phase detector 12 includes multipliers M1 and M2, and band pass filters BPF1 and BPF2. First input terminals of the multipliers M1 and M2 are connected via the baseband channel 11 to the transducer element P3 in the probe 1. Thus, the echo electric RF signal is transmitted from the transducer element P3 to the multipliers M1 and M2. A second input terminal of the multiplier M1 is connected to the first output terminal of the signal generator 14. A second input terminal of the multiplier M2 is connected to the second output terminal of the signal generator 14. An output terminal of the multiplier M1 is connected via the band pass filter BPF1 to the second input terminal of the switch SW1. An output terminal of the multiplier M2 is connected via the band pass filter BPF2 to the second input terminal of the switch SW2.

The phase detector 13 includes multipliers M3 and M4, and band pass filters BPF3 and BPF4. First input terminals of the multipliers M3 and M4 are connected via the baseband channel 11 to the transducer element P4 in the probe 1. Thus, the echo electric RF signal is transmitted from the transducer element P4 to the multipliers M3 and M4. A second input terminal of the multiplier M3 is connected to the first output terminal of the signal generator 14. A second input terminal of the multiplier M4 is connected to the second output terminal of the signal generator 14. An output terminal of the multiplier M3 is connected via the band pass filter BPF3 to the second input terminal of the switch SW3. An output terminal of the multiplier M4 is connected via the band pass filter BPF4 to the second input terminal of the switch SW4.

The signal generator 14 produces a pair of an in-phase carrier signal "$\cos(\omega t)$" and a quadrature carrier signal "$\sin(\omega t)$" having a predetermined angular frequency "$\omega$" which corresponds to a carrier frequency of the echo electric RF signals outputted from the transducer elements P3 and P4 in the probe 1. In the characters "$\cos(\omega t)$" and "$\sin(\omega t)$", "t" denotes time. The signal generator 14 feeds the in-phase carrier signal "$\cos(\omega t)$" to the multiplier M1 in the phase detector 12 and also the multiplier M3 in the phase detector 13. The signal generator 14 feeds the quadrature carrier signal "$\sin(\omega t)$" to the multiplier M2 in the phase detector 12 and also the multiplier M4 in the phase detector 13.

In the phase detector 12, the device M1 multiplies the echo electric RF signal from the transducer element P3 and the in-phase carrier signal "cos(ωt)", thereby mixing the echo electric RF signal and the in-phase carrier signal "cos(ωt)" and generating mixing-resultant signals including a baseband in-phase signal. The multiplier M1 outputs the mixing-resultant signals to the band pass filter BPF1. The band pass filter BPF1 extracts the baseband in-phase signal from the mixing-resultant signals. The band pass filter BPF1 outputs the extracted baseband in-phase signal to the switch SW1.

In the phase detector 12, the device M2 multiplies the echo electric RF signal from the transducer element P3 and the quadrature carrier signal "sin(ωt)", thereby mixing the echo electric RF signal and the quadrature carrier signal "sin(ωt)" and generating mixing-resultant signals including a baseband quadrature signal. The multiplier M2 outputs the mixing-resultant signals to the band pass filter BPF2. The band pass filter BPF2 extracts the baseband quadrature signal from the mixing-resultant signals. The band pass filter BPF2 outputs the extracted baseband quadrature signal to the switch SW2.

In the phase detector 13, the device M3 multiplies the echo electric RF signal from the transducer element P4 and the in-phase carrier signal "cos(ωt)", thereby mixing the echo electric RF signal and the in-phase carrier signal "cos(ωt)" and generating mixing-resultant signals including a baseband in-phase signal. The multiplier M3 outputs the mixing-resultant signals to the band pass filter BPF3. The band pass filter BPF3 extracts the baseband in-phase signal from the mixing-resultant signals. The band pass filter BPF3 outputs the extracted baseband in-phase signal to the switch SW3.

In the phase detector 13, the device M4 multiplies the echo electric RF signal from the transducer element P4 and the quadrature carrier signal "sin(ωt)", thereby mixing the echo electric RF signal and the quadrature carrier signal "sin(ωt)" and generating mixing-resultant signals including a baseband quadrature signal. The multiplier M4 outputs the mixing-resultant signals to the band pass filter BPF4. The band pass filter BPF4 extracts the baseband quadrature signal from the mixing-resultant signals. The band pass filter BPF4 outputs the extracted baseband quadrature signal to the switch SW4.

The switches SW1, SW2, SW3, and SW4 select either a set of the echo electric RF signals from the transducer elements P1, P2, P3, and P4 or a set of the output baseband signals from the phase detectors 12 and 13. The switches SW1, SW2, SW3, and SW4 transmit and output the selected signal set to the reception beam former 4.

The reception beam former 4 is connected to a phase shift data generator 5. An output terminal of the reception beam former 4 is connected to a first input terminal of a phase detector 6. The phase detector 6 is of a digital type. A second input terminal of the phase detector 6 is connected to a first output terminal of a control signal generator 7. A third input terminal of the phase detector 6 is connected to a second output terminal of the control signal generator 7. A first output terminal of the phase detector 6 is connected to a B-mode processor 8 and a frequency analyzer 9. Also, a second output terminal of the phase detector 6 is connected to the B-mode processor 8 and the frequency analyzer 9. The B-mode processor 8 and the frequency analyzer 9 are connected to a display 10.

The phase shift data generator 5 produces phase shift data (digital phase shift signals) Cn and Sn where n=1, ..., N. Here, "N" denotes a predetermined natural number equal to or greater than 2. For example, the phase shift data generator 5 produces digital phase shift data C1, C2, S1, and S2. The phase shift data generator 5 feeds the phase shift data C1, C2, S1, and S2 to the reception beam former 4.

The reception beam former 4 subjects the output signals from the switches SW1, SW2, SW3, and SW4 to processes including a weighting process, a delaying process, and an adding process. The weighting process can be replaced by a phase shifting process which is responsive to the phase shift signals C1, C2, S1, and S2. The reception beam former 4 outputs a process-resultant signal to the phase detector 6.

The phase detector 6 includes multipliers M9 and M10. First input terminals of the multipliers M9 and M10 are connected to the output terminal of the reception beam former 4. Thus, the multipliers M9 and M10 receive the output signal from the reception beam former 4. A second input terminal of the multiplier M9 is connected to the first output terminal of the control signal generator 7. A second input terminal of the multiplier M10 is connected to the second output terminal of the control signal generator 7. An output terminal of the multiplier M9 is connected to the B-mode processor 8 and the frequency analyzer 9. Also, an output terminal of the multiplier M10 is connected to the B-mode processor 8 and the frequency analyzer 9.

The control signal generator 7 produces a pair of an in-phase control signal (an in-phase carrier or reference signal) "C" and a quadrature control signal (a quadrature carrier or reference signal) "S". The control signal generator 7 feeds the in-phase control signal "C" to the multiplier M9 in the phase detector 6. The control signal generator 7 feeds the quadrature control signal "S" to the multiplier M10 in the phase detector 6.

In the phase detector 6, the device M9 multiplies the output signal of the reception beam former 4 and the in-phase control signal "C", thereby demodulating the output signal of the reception beam former 4 into a demodulation-resultant in-phase signal "I". The multiplier M9 outputs the demodulation-resultant in-phase signal "I" to the B-mode processor 8 and the frequency analyzer 9.

In the phase detector 6, the device M10 multiplies the output signal of the reception beam former 4 and the quadrature control signal "S", thereby demodulating the output signal of the reception beam former 4 into a demodulation-resultant quadrature signal "Q". The multiplier M10 outputs the demodulation-resultant quadrature signal "Q" to the B-mode processor 8 and the frequency analyzer 9.

The B-mode processor 8 subjects the output in-phase signal "I" and the output quadrature signal "Q" of the phase detector 6 to a process for a B-mode. The B-mode processor 8 generates a process-resultant video signal, that is, a B-mode video signal. The B-mode processor 8 outputs the B-mode video signal to the display 10. An image represented by the B-mode video signal is indicated by the display 10.

The frequency analyzer 9 subjects the output in-phase signal "I" and the output quadrature signal "Q" of the phase detector 6 to a Doppler frequency analysis. The frequency analyzer 9 generates an analysis-resultant signal representing Doppler velocity information. The frequency analyzer 9 outputs the analysis-resultant signal to the display 10. The Doppler velocity information represented by the analysis-resultant signal is indicated by the display 10. The Doppler frequency analysis implemented by the frequency analyzer 9 can be changed between a color Doppler process and a spectral Doppler process.

Preferably, the delaying process implemented by the reception beam former 4 is designed to focus a received beam of echo ultrasound waves at a focal point within the examined body. In FIG. 1, the reception focal point is at a distance r3 from the transducer element P3. A reflector or a target 15 exists at the reception focal point.

A controller 50 is connected to the transmission beam former 2, the switches SW1, SW2, SW3, and SW4, the reception beam former 4, the phase shift data generator 5, the control signal generator 7, the B-mode processor 8, and the frequency analyzer 9. In addition, the controller 50 is connected to an input unit 52.

Operation of the ultrasound diagnostic apparatus of FIG. 1 can be changed among various modes including the B-mode, a color Doppler mode, and an SCW Doppler mode. Here, "SCW" is short for "steerable continuous wave". The input unit 52 can be accessed by a user or an operator. The input unit 52 outputs a command signal representative of a target operation mode to the controller 50. The target operation command represented by the command signal can be changed by actuating the input unit 52. The device 50 controls the transmission beam former 2, the switches SW1, SW2, SW3, and SW4, the reception beam former 4, the phase shift data generator 5, the control signal generator 7, the B-mode processor 8, and the frequency analyzer 9 in response to the command signal so that the ultrasound diagnostic apparatus will operate in a mode equal to the target mode represented by the command signal. The actual mode of operation of the ultrasound diagnostic apparatus can be changed from one to another by actuating the input unit 52.

By way of example, the controller 50 includes a microcomputer or a similar device which operates in accordance with a program stored in a memory. The program is designed to enable the controller 50 to implement control processes mentioned later.

Figure 2:
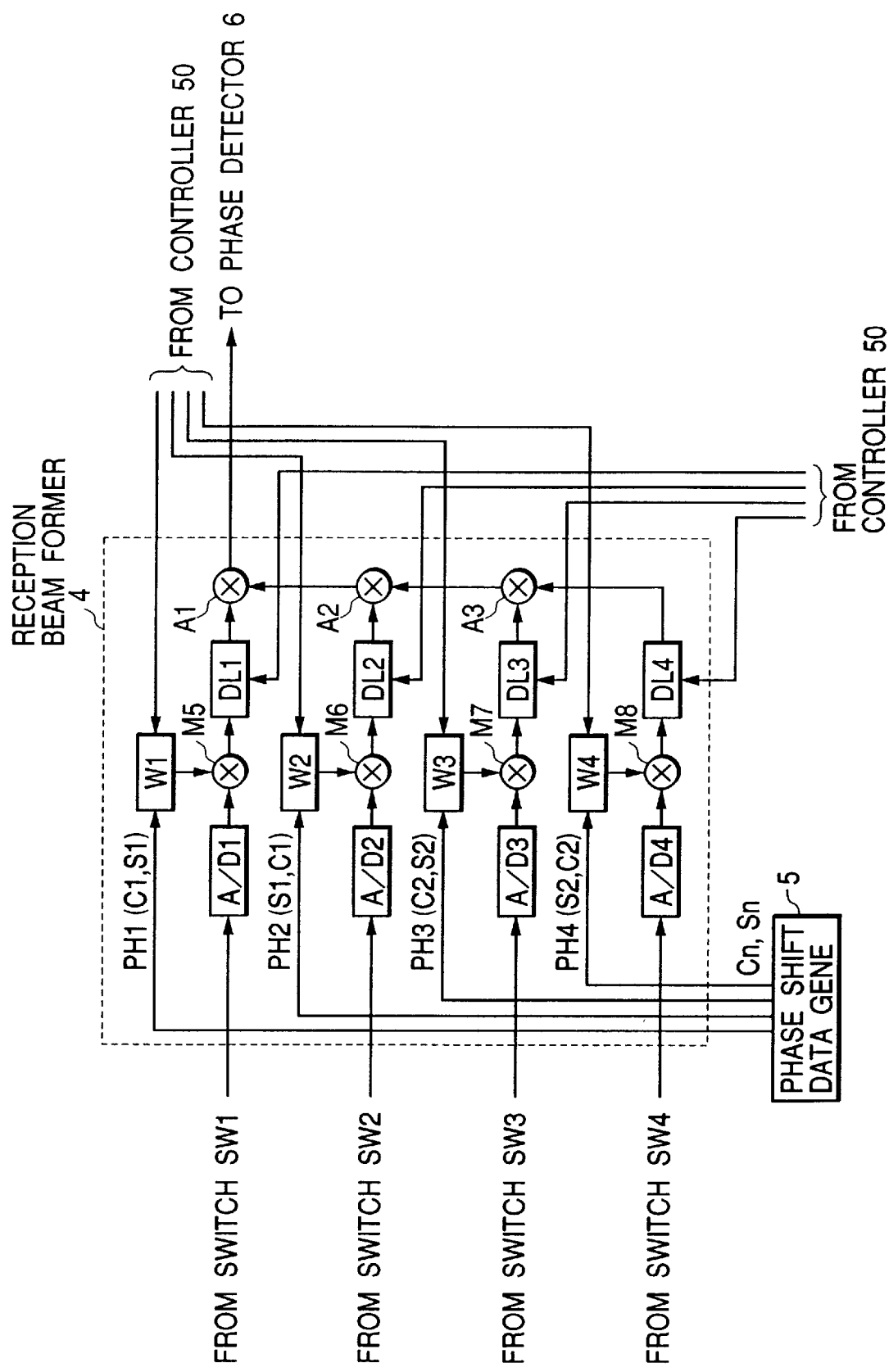
FIG. 2 is a block diagram of a reception beam former in FIG. 1.

As shown in FIG. 2, the reception beam former 4 includes analog-to-digital converters A/D1, A/D2, A/D3, and A/D4, weighting-factor generators W1, W2, W3, and W4, multipliers M5, M6, M7, and M8, delay lines DL1, DL2, DL3, and DL4, and adders A1, A2, and A3.

Input terminals of the analog-to-digital converters A/D1, A/D2, A/D3, and A/D4 are connected to the output terminals of the switches SW1, SW2, SW3, and SW4, respectively. Output terminals of the analog-to-digital converters A/D1, A/D2, A/D3, and A/D4 are connected to first input terminals of the multipliers M5, M6, M7, and M8, respectively. Input terminals of the weighting-factor generators W1, W2, W3, and W4 are connected to the phase shift data generator 5. Output terminals of the weighting-factor generators W1, W2, W3, and W4 are connected to second input terminals of the multipliers M5, M6, M7, and M8, respectively. Output terminals of the multipliers M5, M6, and M7 are connected to first input terminals of the adders A1, A2, and A3 via the delay lines DL1, DL2, and DL3, respectively. An output terminal of the multiplier M8 is connected to a second input terminal of the adder A3 via the delay line DL4. An output terminal of the adder A3 is connected to a second input terminal of the adder A2. An output terminal of the adder A2 is connected to a second input terminal of the adder A1. An output terminal of the adder A1 is connected to the phase detector 6. The weighting-factor generators W1, W2, W3, and W4 are connected to the controller 50. The delay lines DL1, DL2, DL3, and DL4 are connected to the controller 50.

During the B-mode or the color Doppler mode of operation of the ultrasound diagnostic apparatus, the transmission beam former 2 is controlled by the controller 50 to output the electric PW signals to the transducer elements P1, P2, P3, and P4 respectively. The transducer elements P1, P2, P3, and P4 convert the electric PW signals into ultrasound waves which propagate into the examined body as forward ultrasound waves, respectively. Portions of the forward ultrasound waves are reflected in the examined body before being returned to the transducer elements P1, P2, P3, and P4 as echo ultrasound waves. The transducer elements P1, P2, P3, and P4 convert the echo ultrasound waves into echo electric RF signals, respectively. The transducer elements P1, P2, P3, and P4 output the echo electric RF signals, respectively. The RF channel 3 transmits the echo electric RF signals from the transducer elements P1, P2, P3, and P4 to the switches SW1, SW2, SW3, and SW4 respectively. The switches SW1, SW2, SW3, and SW4 are controlled by the controller 50, thereby selecting the echo electric RF signals outputted from the transducer elements P1, P2, P3, and P4 respectively. The switches SW1, SW2, SW3, and SW4 transmit the selected echo electric RF signals to the reception beam former 4.

During the B-mode or the color Doppler mode of operation of the ultrasound diagnostic apparatus, the weighting-factor generators W1, W2, W3, and W4 in the reception beam former 4 are controlled by the controller 50 to feed the multipliers M5, M6, M7, and M8 with respective signals representative of weighting factors suited for the B-mode or the color Doppler mode. The analog-to-digital converter A/D1 changes the output RF signal of the switch SW1 into a corresponding digital signal. The analog-to-digital converter A/D1 outputs the digital signal to the multiplier M5. The analog-to-digital converter A/D2 changes the output RF signal of the switch SW2 into a corresponding digital signal. The analog-to-digital converter A/D2 outputs the digital signal to the multiplier M6. The analog-to-digital converter A/D3 changes the output RF signal of the switch SW3 into a corresponding digital signal. The analog-to-digital converter A/D3 outputs the digital signal to the multiplier M7. The analog-to-digital converter A/D4 changes the output RF signal of the switch SW4 into a corresponding digital signal. The analog-to-digital converter A/D4 outputs the digital signal to the multiplier M8. The device M5 multiplies the output digital signal of the analog-to-digital converter A/D1 by the related weighting factor, and outputs a multiplication-resultant signal to the delay line DL1. The multiplication-resultant signal is transmitted through the delay line DL1 to the adder A1. The delay line DL1 is controlled by the controller 50 to provide a suitable delay to the output signal from the multiplier M5. The device M6 multiplies the output digital signal of the analog-to-digital converter A/D2 by the related weighting factor, and outputs a multiplication-resultant signal to the delay line DL2. The multiplication-resultant signal is transmitted through the delay line DL2 to the adder A2. The delay line DL2 is controlled by the controller 50 to provide a suitable delay to the output signal from the multiplier M6. The device M7 multiplies the output digital signal of the analog-to-digital converter A/D3 by the related weighting factor, and outputs a multiplication-resultant signal to the delay line DL3. The multiplication-resultant signal is transmitted through the delay line DL3 to the adder A3. The delay line DL3 is controlled by the controller 50 to provide a suitable delay to the output signal from the multiplier M7. The device M8 multiplies the output digital signal of the analog-to-digital converter A/D4 by the related weighting factor, and outputs a multiplication-resultant signal to the delay line DL4. The multiplication-resultant signal is transmitted through the delay line DL4 to the adder A3. The delay line DL4 is controlled by the controller 50 to provide a suitable delay to the output signal from the multiplier M8. The multiplications between the output signals of the analog-to-digital converters A/D1, A/D2, A/D3, and A/D4 and the weighting factors are designed to improve the directivity with respect to a received beam of echo ultrasound waves. The device A3 adds the signal from the delay line DL3 and the signal from the DL4 into an addition-resultant signal. The adder A3 outputs the addition-resultant signal to the adder A2. The device A2 adds the signal from the delay line DL2 and the signal from the adder A3 into an addition-resultant signal. The adder A2 outputs the addition-resultant signal to the adder A1. The device A1 adds the signal from the delay line DL1 and the signal from the adder A2 into an addition-resultant signal. The adder A1 outputs the addition-resultant signal to the phase detector 6.

During the B-mode or the color Doppler mode of operation of the ultrasound diagnostic apparatus, the control signal generator 7 is controlled by the controller 50 to generate an in-phase control "C" and a quadrature control signal "S" equal to an in-phase carrier signal and a quadrature carrier signal respectively. The control signal generator 7 feeds the in-phase carrier signal "C" to the multiplier M9 in the phase detector 6. The control signal generator 7 feeds the quadrature carrier signal "S" to the multiplier M10 in the phase detector 6. The multipliers M9 and M10 in the phase detector 6 receive the output signal of the reception beam former 4. The device M9 multiplies the output signal of the reception beam former 4 and the in-phase carrier signal "C", thereby demodulating or converting the output signal of the reception beam former 4 into a baseband in-phase signal "I". The multiplier M9 outputs the baseband in-phase signal "I" to the B-mode processor 8 and the frequency analyzer 9. The device M10 multiplies the output signal of the reception beam former 4 and the quadrature carrier signal "S", thereby demodulating or converting the output signal of the reception beam former 4 into a baseband quadrature signal "Q". The multiplier M10 outputs the baseband quadrature signal "Q" to the B-mode processor 8 and the frequency analyzer 9.

During the B-mode of operation of the ultrasound diagnostic apparatus, the B-mode processor 8 is controlled by the controller 50 to subject the output baseband in-phase and quadrature signals "I" and "Q" from the phase detector 6 to the process for the B-mode. The B-mode processor 8 generates a process-resultant video signal, that is, a B-mode video signal. The B-mode processor 8 outputs the B-mode video signal to the display 10. An image represented by the B-mode video signal is indicated by the display 10.

During the color Doppler mode of operation of the ultrasound diagnostic apparatus, the frequency analyzer 9 is controlled by the controller 50 to subject the output baseband in-phase and quadrature signals "I" and "Q" from the phase detector 6 to the Doppler frequency analysis including the color Doppler process. The frequency analyzer 9 generates an analysis-resultant signal representing color Doppler velocity information. The frequency analyzer 9 outputs the analysis-resultant signal to the display 10. The color Doppler velocity information represented by the analysis-resultant signal is indicated by the display 10. The color Doppler velocity information may be visually superimposed on a B-mode image indicated by the display 10.

During the SCW Doppler mode of operation of the ultrasound diagnostic apparatus, the transducer elements P1 and P2 are assigned to transmission while the transducer elements P3 and P4 are assigned to reception. The transmission beam former 2 is controlled by the controller 50 to output the electric CW signals to the transducer elements P1 and P2 respectively. The electric CW signals have the predetermined angular frequency "$\omega$". The transducer elements P1 and P2 convert the electric CW signals into ultrasound waves which propagate into the examined body as forward ultrasound waves, respectively. Portions of the forward ultrasound waves are reflected by the target (the reflector) 15 in the examined body before being backwardly propagated to the transducer elements P3 and P4 as echo ultrasound waves. The reflector 15 is, for example, blood corpuscles. The transducer elements P3 and P4 convert the echo ultrasound waves into echo electric RF signals e3 and e4, respectively. The transducer elements P3 and P4 output the echo electric RF signals e3 and e4, respectively. The baseband channel 11 transmits the echo electric RF signals e3 and e4 from the transducer elements P3 and P4 to the phase detectors 12 and 13 respectively. Specifically, the echo electric RF signal e3 from the transducer element P3 is applied to the multipliers M1 and M2 in the phase detector 12. On the other hand, the echo electric RF signal e4 from the transducer element P4 is applied to the multipliers M3 and M4 in the phase detector 13.

The signal generator 14 feeds the in-phase carrier signal "$\cos(\omega t)$" to the multiplier M1 in the phase detector 12 and also the multiplier M3 in the phase detector 13. The signal generator 14 feeds the quadrature carrier signal "$\sin(\omega t)$" to the multiplier M2 in the phase detector 12 and also the multiplier M4 in the phase detector 13.

In the phase detector 12, the device M1 multiplies the echo electric RF signal e3 and the in-phase carrier signal "$\cos(\omega t)$", thereby mixing the echo electric RF signal and the in-phase carrier signal "$\cos(\omega t)$" and generating mixing-resultant signals including a baseband in-phase signal I1. The multiplier M1 outputs the mixing-resultant signals to the band pass filter BPF1. The band pass filter BPF1 extracts the baseband in-phase signal I1 from the mixing-resultant signals. The band pass filter BPF1 outputs the extracted baseband in-phase signal I1 to the switch SW1.

In the phase detector 12, the device M2 multiplies the echo electric RF signal e3 and the quadrature carrier signal "$\sin(\omega t)$", thereby mixing the echo electric RF signal e3 and the quadrature carrier signal "$\sin(\omega t)$" and generating mixing-resultant signals including a baseband quadrature signal Q1. The multiplier M2 outputs the mixing-resultant signals to the band pass filter BPF2. The band pass filter BPF2 extracts the baseband quadrature signal Q1 from the mixing-resultant signals. The band pass filter BPF2 outputs the extracted baseband quadrature signal Q1 to the switch SW2.

In the phase detector 13, the device M3 multiplies the echo electric RF signal e4 and the in-phase carrier signal "$\cos(\omega t)$", thereby mixing the echo electric RF signal e4 and the in-phase carrier signal "$\cos(\omega t)$" and generating mixing-resultant signals including a baseband in-phase signal I2. The multiplier M3 outputs the mixing-resultant signals to the band pass filter BPF3. The band pass filter BPF3 extracts the baseband in-phase signal I2 from the mixing-resultant signals. The band pass filter BPF3 outputs the extracted baseband in-phase signal I2 to the switch SW3.

In the phase detector 13, the device M4 multiplies the echo electric RF signal e4 and the quadrature carrier signal "$\sin(\omega t)$", thereby mixing the echo electric RF signal e4 and the quadrature carrier signal "$\sin(\omega t)$" and generating mixing-resultant signals including a baseband quadrature signal Q2. The multiplier M4 outputs the mixing-resultant signals to the band pass filter BPF4. The band pass filter BPF4 extracts the baseband quadrature signal Q2 from the mixing-resultant signals. The band pass filter BPF4 outputs the extracted baseband quadrature signal Q2 to the switch SW4.

In the case where the reflector (the target) 15 is moving, the echo ultrasound waves caused by the reflector 15 undergo a Doppler shift. Thus, in this case, the angular frequency "ωd" of the echo ultrasound waves is given as "ωd=ω+Wd" where "Wd" denotes the Doppler shift. The phase detectors 12 and 13 are similar to each other in operation. Accordingly, only operation of the phase detector 12 will be described in more detail. By way of example, the echo electric RF signal e3 outputted from the transducer element P3 is expressed as follows.

$$e3 = A \cdot \sin(\omega d \cdot t - k \cdot r3) + B \cdot \sin(\omega \cdot t + f) \tag{1}$$

where "A" and "B" denotes amplitudes respectively; "k" denotes a wave number; "t" denotes time; "r3" denotes the distance between the reflector 15 and the transducer element P3; and "f" denotes a phase (a phase change). The first term in the right-hand side of the equation (1) corresponds to echo ultrasound waves coming from the reflector 15. The second term in the right-hand side of the equation (1) denote clutter signals caused by motionless tissues or slowly-moving tissues within the examined body. The phase change "f" in the clutter signals is small. In general, the amplitude "B" is greater than the amplitude "A" by one order or more. As previously mentioned, the devices M1 and M2 multiply the echo electric RF signal e3 by the in-phase carrier signal "(ωt)" and the quadrature carrier signal "sin(ωt)" fed from the signal generator 14. The band pass filters BPF1 and BPF2 remove high-frequency components and clutter components from the output signals of the multipliers M1 and M2, thereby generating the baseband in-phase signal I1 and the baseband quadrature signal Q2 which are expressed as follows.

$$I1 = \sin(Wd \cdot t - k \cdot r3) \tag{2}$$

$$Q1 = \cos(Wd \cdot t - k \cdot r3) \tag{3}$$

The baseband signals I1 and Q1 are quadrature with each other.

During the SCW Doppler mode of operation of the ultrasound diagnostic apparatus, the switches SW1, SW2, SW3, and SW4 are controlled by the controller 50, thereby selecting the baseband signals I1, Q1, I2, and Q2 outputted from the phase detectors 12 and 13. The switches SW1, SW2, SW3, and SW4 transmit the selected baseband signals I1, Q1, I2, and Q2 to the reception beam former 4. The reception beam former 4 includes a first portion for processing the baseband signals I1 and Q1, and a second portion for processing the baseband signals I2 and Q2. The first and second portions of the reception beam former 4 are similar to each other in operation. Accordingly, only operation of the first portion of the reception beam former 4 will be described in more detail. As understood from the equations (2) and (3), the output baseband signals I1 and Q1 of the phase detector 12 depend on the distance r3 between the reflector 15 and the transducer element P3. Similarly, the output baseband signals I2 and Q2 of the phase detector 13 depend on the distance between the reflector 15 and the transducer element P4. It is desirable to remove the distance-dependencies from the baseband signals I1, Q1, I2, and Q2 before they are phase-adjusted and summed. By way of example, regarding the baseband signals I1 and Q1, the removal of the distance-dependencies can be implemented by a phase shifting process including a step of multiplication by a complex number exp(jk·r3) as indicated by the following equations.

$$I + jQ = (I1 + jQ1) \cdot \exp(jk \cdot r3) \tag{4}$$

$$= \cos(Wd \cdot t) + j \sin(Wd \cdot t) \tag{5}$$

The equations (4) and (5) correspond to the following I-side and Q-side equations.

$$I = I1 \cdot \cos(k \cdot r3) - Q1 \cdot \sin(k \cdot r3) \tag{6}$$

$$Q = Q1 \cdot \cos(k \cdot r3) - I1 \cdot \sin(k \cdot r3) \tag{7}$$

The reception beam former 4 and the phase shift data generator 5 cooperate to process the baseband signals I1 and Q1 according to the I-side and Q-side equations (6) and (7).

During the SCW Doppler mode of operation of the ultrasound diagnostic apparatus, the analog-to-digital converter A/D1 in the reception beam former 4 generates a digital version of the baseband signal I1. The analog-to-digital converter A/D1 outputs the digital baseband signal I1 to the multiplier M5. The analog-to-digital converter A/D2 in the reception beam former 4 generates a digital version of the baseband signal Q1. The analog-to-digital converter A/D2 outputs the digital baseband signal Q1 to the multiplier M6. The analog-to-digital converter A/D3 in the reception beam former 4 generates a digital version of the baseband signal I2. The analog-to-digital converter A/D3 outputs the digital baseband signal I2 to the multiplier M7. The analog-to-digital converter A/D4 in the reception beam former 4 generates a digital version of the baseband signal Q2. The analog-to-digital converter A/D4 outputs the digital baseband signal Q2 to the multiplier M8.

During the SCW Doppler mode of operation of the ultrasound diagnostic apparatus, the weighting-factor generators W1, W2, W3, and W4 in the reception beam former 4 are held in through-states by the controller 50. The phase shift data generator 5 is controlled by the controller 50 to generate digital phase shift signals PH1, PH2, PH3, and PH4. The phase shift signal PH1 is transmitted from the phase shift data generator 5 to the multiplier M5 in the reception beam former 4 via the weighting-factor generator W1. The phase shift signal PH1 contains phase shift data C1 and S1. The phase shift signal PH2 is transmitted from the phase shift data generator 5 to the multiplier M6 in the reception beam former 4 via the weighting-factor generator W2. The phase shift signal PH2 contains the phase shift data C1 and S1. The phase shift signal PH3 is transmitted from the phase shift data generator 5 to the multiplier M7 in the reception beam former 4 via the weighting-factor generator W3. The phase shift signal PH3 contains phase shift data C2 and S2. The phase shift signal PH4 is transmitted from the phase shift data generator 5 to the multiplier M8 in the reception beam former 4 via the weighting-factor generator W4. The phase shift signal PH4 contains the phase shift data C2 and S2.

By way of example, the phase shift data C1 are set as "C1=cos(k·r3)". The phase shift data S1 are set as "S1=sin (k·r3)". The phase shift signals PH1 and PH2 are fed to the devices M5 and M6 as multipliers. The phase shift signals PH1 and PH2, that is, the multipliers used by the devices M5 and M6, are changed according to the following equations.

$$PH1 = C1 \cdot MOD(i, 2) + S1 \cdot MOD(i+1, 2) \tag{8}$$

$$PH2 = -S1 \cdot MOD(i, 2) + C1 \cdot MOD(i+1, 2) \tag{9}$$

where "i" denotes an integer which increases in accordance with lapse of time "t" as "t=iT" (T means the sampling period used in the analog-to-digital converters A/D1, A/D2, A/D3, and A/D4), and "MOD( . . . )" denotes modulo-operation. The digital baseband signals I1 and Q1 change once during a time interval for which the integer "i" changes twice.

With reference to FIG. 3, at a moment t=1T, the phase shift signal PH1 is equal to the phase shift data C1 while the phase shift signal PH2 is equal to an inversion of the phase shift data S1. Thus, at the moment t=1T, the device M5 multiplies the digital baseband signal I1(1) and the phase shift data C1, and thereby generates and outputs a multiplication-resultant signal I1(1)·C1. At the same time, the device M6 multiplies the digital baseband signal Q1(1) and the inversion of the phase shift data S1, and thereby generates and outputs a multiplication-resultant signal −Q1(1)·S1. The multiplication-resultant signal I1(1)·C1, the multiplication-resultant signal −Q1(1)·S1, a multiplication-resultant signal outputted from the multiplier M7, and a multiplication-resultant signal outputted from the multiplier MS are combined into a combination-resultant signal IQm by the adders A1, A2, and A3. At the moment t=1T, components of the combination-resultant signal IQm which relate to the digital baseband signals I1 and Q1 are given as "I1(1)·C1−Q1(1)·S1" corresponding to the I-side equation (6).

At a moment t=2T following the moment t=1T, the phase shift signal PH1 is equal to the phase shift data S1 while the phase shift signal PH2 is equal to the phase shift data C1. Thus, at the moment t=2T, the device M5 multiplies the digital baseband signal I1(1) and the phase shift data S1, and thereby generates and outputs a multiplication-resultant signal I1(1)·S1. At the same time, the device M6 multiplies the digital baseband signal Q1(1) and the phase shift data C1, and thereby generates and outputs a multiplication-resultant signal Q1(1)·C1. The multiplication-resultant signal I1(1)·S1, the multiplication-resultant signal Q1(1)·C1, a multiplication-resultant signal outputted from the multiplier M7, and a multiplication-resultant signal outputted from the multiplier M8 are combined into a combination-resultant signal IQm by the adders A1, A2, and A3. At the moment t=2T, components of the combination-resultant signal IQm which relate to the digital baseband signals I1 and Q1 are given as "I1(1)·S1+Q1(1)·C1" corresponding to the Q-side equation (7).

As shown in FIG. 3, at a moment t=3T and later moments after the moment t=2T, processes similar to the above-mentioned processes are periodically iterated. Therefore, the signal components corresponding to the I-side equation (6) and the signal components corresponding to the Q-side equation (7) alternate in the combination-resultant signal IQm. Thus, in the combination-resultant signal IQm, the signal components corresponding to the I-side equation (6) and the signal components corresponding to the Q-side equation (7) are multiplexed on a time sharing basis.

The output signal of the multiplier M5 is transmitted to the adder A1 via the delay line DL1. The output signal of the multiplier M6 is transmitted to the adder A2 via the delay line DL2. During the SCW Doppler mode of operation of the ultrasound diagnostic apparatus, the delay lines DL1 and DL2 are controlled by the controller 50 to provide equal or slightly-different delays to the output signals of the multipliers M5 and M6. Preferably, the delays provided by the delay lines DL1 and DL2 are equal to fixed time intervals respectively. Preferably, the difference between the delays provided to the output signals of the multipliers M5 and M6 is equal to or smaller than one tenth of one period of the phase shift data C1 and S1. In the case where the phase shift data C1 and S1 have a frequency of about 50 KHz or less, the difference between the delays is preferably equal to or smaller than one tenth of 20 microseconds (one period of the phase shift data C1 and S1).

During the SCW Doppler mode of operation of the ultrasound diagnostic apparatus, the multipliers M9 and M10 in the phase detector 6 receive the combination-resultant signal IQm from the reception beam former 4. The control signal generator 7 is controlled by the controller 50 to produce the in-phase control signal "C" and the quadrature control signal "S". The control signal generator 7 feeds the in-phase control signal "C" to the multiplier M9 in the phase detector 6. T control signal generator 7 feeds the quadrature control signal "S" to the multiplier M10 in the phase detector 6. The in-phase control signal "C" and the quadrature control signal "S" are changed according to the following equations.

$$C = \text{MOD}(i, 2) \tag{10}$$

$$S = \text{MOD}(i+2, 2) \tag{11}$$

where "i" denotes an integer which increases in accordance with lapse of time "t" as "t=iT" (T means the sampling period used in the analog-to-digital converters A/D1, A/D2, A/D3, and A/D4), and "MOD( . . . )" denotes modulo-operation. The device M9 multiplies the combination-resultant signal IQm and the in-phase control signal "C", thereby separating or recovering a demodulation-resultant in-phase signal "I" from the combination-resultant signal IQm. The multiplier M9 outputs the demodulation-resultant in-phase signal "I" to the frequency analyzer 9. On the other hand, the device M10 multiplies the combination-resultant signal IQm and the quadrature control signal "S", thereby separating or recovering a demodulation-resultant quadrature signal "Q" from the combination-resultant signal IQm. The multiplier M10 outputs the demodulation-resultant quadrature signal "Q" to the frequency analyzer 9.

Operation of the phase detector 6 regarding the baseband signals I1 and Q1 will be described in more detail. With reference to FIG. 3, at the moment t=1T, the in-phase control signal "C" is equal to "1" while the quadrature control signal "S" is equal to "0". At the same time, regarding the baseband signals I1 and Q1, the combination-resultant signal IQm is expressed as "I1(1)·C1−Q1(1)·S1". Thus, at the moment t=1T, the device M9 multiplies "I1(1)·C1−Q1(1)·S1" and "1", and outputs the multiplication result "I1(1)·C1−Q1(1)·S1" as the demodulation-resultant in-phase signal "I". At the same time, the device M10 multiplies "I1(1)·C1−Q1(1)·S1" and "0", and outputs the multiplication result "0" as the demodulation-resultant quadrature signal "Q".

At the moment t=2T following the moment t=1T, the in-phase control signal "C" is equal to "0" while the quadrature control signal "S" is equal to "1". At the same time, regarding the baseband signals I1 and Q1, the combination-resultant signal IQm is expressed as "I1(1)·S1+Q1(1)·C1". Thus, at the moment t=2T, the device M9 multiplies "I1(1)·S1+Q1(1)·C1" and "0", and outputs the multiplication result "0" as the demodulation-resultant in-phase signal "I". At the same time, the device M10 multiplies "I1(1)·S1+Q1(1)·C1" and "1", and outputs the multiplication result "I1(1)·S1+Q1(1)·C1" as the demodulation-resultant quadrature signal "Q".

As shown in FIG. 3, at the moment t=3T and later moments after the moment t=2T, processes similar to the above-mentioned processes are periodically iterated. Thus, the phase detector 6 and the control signal generator 7 cooperate to demultiplex the combination-resultant signal IQm into the demodulation-resultant in-phase signal "I" and the demodulation-resultant quadrature signal "Q".

During the SCW Doppler mode of operation of the ultrasound diagnostic apparatus, the frequency analyzer 9 is controlled by the controller 50 to subject the demodulation-resultant in-phase signal "I" and the demodulation-resultant quadrature signal "Q" to the Doppler frequency analysis including the spectral Doppler process. The frequency analyzer 9 generates an analysis-resultant signal representing spectral Doppler velocity information. The frequency analyzer 9 outputs the analysis-resultant signal to the display 10. The spectral Doppler velocity information represented by the analysis-resultant signal is indicated by the display 10.

During the SCW Doppler mode of operation of the ultrasound diagnostic apparatus, it is preferable that the delay lines DL1, DL2, DL3, and DL4 in the reception beam former 4 provide different delays to the output signals of the multipliers M5, M6, M7, and M8 respectively. In this case, an enhanced noise-reduction effect is available. It should be noted that the delays provided to the output signals of the multipliers M5, M6, M7, and M8 may be null.

Second Embodiment

A second embodiment of this invention is similar to the first embodiment thereof except for design changes indicated hereinafter.

During the SCW Doppler mode of operation of the ultrasound diagnostic apparatus, the phase shift signals PH1 and PH2, that is, the multipliers used by the devices M5 and M6, are changed according to the following equations.

$$PH1=\{C1\text{-}MOD(i, 2)+S1\text{-}MOD(i+1, 2)\}\text{-}SIGN \quad (12)$$

$$PH2=\{-S1\text{-}MOD(i, 2)+C1\text{-}MOD(i+1, 2)\}\text{-}SIGN \quad (13)$$

where SIGN=1 when MOD(i−1, 4)≦1, and SIGN=−1 when MOD(i−1, 4)≧2.

With reference to FIG. 4, at a moment t=1T, the phase shift signal PH1 is equal to the phase shift data C1 while the phase shift signal PH2 is equal to an inversion of the phase shift data S1. Thus, at the moment t=1T, the device M5 multiplies the digital baseband signal I1(1) and the phase shift data C1, and thereby generates and outputs a multiplication-resultant signal I1(1)·C1. At the same time, the device M6 multiplies the digital baseband signal Q1(1) and the inversion of the phase shift data S1, and thereby generates and outputs a multiplication-resultant signal −Q1(1)·S1. The multiplication-resultant signal I1(1)·C1, the multiplication-resultant signal −Q1(1)·S1, a multiplication-resultant signal outputted from the multiplier M7, and a multiplication-resultant signal outputted from the multiplier M8 are combined into a combination-resultant signal IQm by the adders A1, A2, and A3. At the moment t=1T, components of the combination-resultant signal IQm which relate to the digital baseband signals I1 and Q1 are given as "I1(1)·C1−Q1(1)·S1" corresponding to the I-side equation (6).

At a moment t=2T following the moment t=1T, the phase shift signal PH1 is equal to the phase shift data S1 while the phase shift signal PH2 is equal to the phase shift data C1. Thus, at the moment t=2T, the device M5 multiplies the digital baseband signal I1(1) and the phase shift data S1, and thereby generates and outputs a multiplication-resultant signal I1(1)·S1. At the same time, the device M6 multiplies the digital baseband signal Q1(1) and the phase shift data C1, and thereby generates and outputs a multiplication-resultant signal Q1(1)·C1. The multiplication-resultant signal I1(1)·S1, the multiplication-resultant signal Q1(1)·C1, a multiplication-resultant signal outputted from the multiplier M7, and a multiplication-resultant signal outputted from the multiplier M8 are combined into a combination-resultant signal IQm by the adders A1, A2, and A3. At the moment t=2T, components of the combination-resultant signal IQm which relate to the digital baseband signals I1 and Q1 are given as "I1(1)·S1+Q1(1)·C1" corresponding to the Q-side equation (7).

At a moment t=3T following the moment t=2T, the phase shift signal PH1 is equal to an inversion of the phase shift data C1 while the phase shift signal PH2 is equal to the phase shift data S1. Thus, at the moment t=3T, the device M5 multiplies the digital baseband signal I1(3) and the inversion of the phase shift data C1, and thereby generates and outputs a multiplication-resultant signal −I1(3)·C1. At the same time, the device M6 multiplies the digital baseband signal Q1(3) and the phase shift data S1, and thereby generates and outputs a multiplication-resultant signal Q1(3)·S1. The multiplication-resultant signal −I1(3)·C1, the multiplication-resultant signal Q1(3)·S1, a multiplication-resultant signal outputted from the multiplier M7, and a multiplication-resultant signal outputted from the multiplier M8 are combined into a combination-resultant signal IQm by the adders A1, A2, and A3. At the moment t=3T, components of the combination-resultant signal IQm which relate to the digital baseband signals I1 and Q1 are given as "−I1(3)·C1+Q1(3)·S1" corresponding to an inversion of the I-side equation (6).

At a moment t=4T following the moment t=3T, the phase shift signal PH1 is equal to an inversion of the phase shift data S1 while the phase shift signal PH2 is equal to an inversion of the phase shift data C1. Thus, at the moment t=4T, the device M5 multiplies the digital baseband signal I1(3) and the inversion of the phase shift data S1, and thereby generates and outputs a multiplication-resultant signal −I1(3)·S1. At the same time, the device M6 multiplies the digital baseband signal Q1(3) and the inversion of the phase shift data C1, and thereby generates and outputs a multiplication-resultant signal −Q1(3)·C1. The multiplication-resultant signal −I1(3)·S1, the multiplication-resultant signal −Q1(3)·C1, a multiplication-resultant signal outputted from the multiplier M7, and a multiplication-resultant signal outputted from the multiplier M8 are combined into a combination-resultant signal IQm by the adders A1, A2, and A3. At the moment t=4T, components of the combination-resultant signal IQm which relate to the digital baseband signals I1 and Q1 are given as "−I1(3)·S1−Q1(3)·C1" corresponding to an inversion of the Q-side equation (7).

At a moment t=5T and later moments after the moment t=4T, processes similar to the above-mentioned processes are periodically iterated. Therefore, the signal components corresponding to the I-side equation (6), the signal components corresponding to the Q-side equation (7), the signal components corresponding to the inversion of the I-side equation (6), and the signal components corresponding to the inversion of the Q-side equation (7) cyclically occur in the combination-resultant signal IQm. Thus, in the combination-resultant signal IQm, the signal components corresponding to the I-side equation (6), the signal components corresponding to the Q-side equation (7), the signal components corresponding to the inversion of the I-side equation (6), and the signal components corresponding to the inversion of the Q-side equation (7) are multiplexed on a time sharing basis.

During the SCW Doppler mode of operation of the ultrasound diagnostic apparatus, the in-phase control signal "C" and the quadrature control signal "S" are changed according to the following equations.

$$C = \cos\{\pi \cdot (i-1)/2\} \quad (14)$$

$$S = \sin\{\pi \cdot (i-1)/2\} \quad (15)$$

Operation of the phase detector 6 regarding the baseband signals I1 and Q1 will be described in more detail. With reference to FIG. 3, at the moment t=1T, the in-phase control signal "C" is equal to "1" while the quadrature control signal "S" is equal to "0". At the same time, regarding the baseband signals I1 and Q1, the combination-resultant signal IQm is expressed as "I1(1)·C1−Q1(1)·S1". Thus, at the moment t=1T, the device M9 multiplies "I1(1)·C1−Q1(1)·S1" and "1", and outputs the multiplication result "I1(1)·C1−Q1(1)·S1" as the demodulation-resultant in-phase signal "I". At the same time, the device M10 multiplies "I1(1)·C1−Q1(1)·S1" and "0", and outputs the multiplication result "0" as the demodulation-resultant quadrature signal "Q".

At the moment t=2T following the moment t=1T, the in-phase control signal "C" is equal to "0" while the quadrature control signal "S" is equal to "1". At the same time, regarding the baseband signals I1 and Q1, the combination-resultant signal IQm is expressed as "I1(1)·S1+Q1(1)·C1". Thus, at the moment t=2T, the device M9 multiplies "I1(1)·S1+Q1(1)·C1" and "0", and outputs the multiplication result "0" as the demodulation-resultant in-phase signal "I". At the same time, the device M10 multiplies "I1(1)·S1+Q1(1)·C1" and "1", and outputs the multiplication result "I1(1)·S1+Q1(1)·C1" as the demodulation-resultant quadrature signal "Q".

At the moment t=3T following the moment t=2T, the in-phase control signal "C" is equal to "−1" while the quadrature control signal "S" is equal to "0". At the same time, regarding the baseband signals I1 and Q1, the combination-resultant signal IQm is expressed as "−I1(3)·C1+Q1(3)·S1". Thus, at the moment t=3T, the device M9 multiplies "−I1(3)·C1−Q1(3)·S1" and "−1", and outputs the multiplication result "I1(3)·C1−Q1(3)·S1" as the demodulation-resultant in-phase signal "I". At the same time, the device M10 multiplies "−I1(3)·C1+Q1(3)·S1" and "0", and outputs the multiplication result "0" as the demodulation-resultant quadrature signal "Q".

At the moment t=4T following the moment t=3T, the in-phase control signal "C" is equal to "0" while the quadrature control signal "S" is equal to "−1". At the same time, regarding the baseband signals I1 and Q1, the combination-resultant signal IQm is expressed as "−I1(3)·S1−Q1(3)·C1". Thus, at the moment t=4T, the device M9 multiplies "−I1(3)·S1−Q1(3)·C1" and "0", and outputs the multiplication result "0" as the demodulation-resultant in-phase signal "I". At the same time, the device M10 multiplies "−I1(3)·S1−Q1(3)·C1" and "−1", and outputs the multiplication result "I1(3)·S1+Q1(3)·C1" as the demodulation-resultant quadrature signal "Q".

At the moment t=5T and later moments after the moment t=4T, processes similar to the above-mentioned processes are periodically iterated. Thus, the phase detector 6 and the control signal generator 7 cooperate to demultiplex the combination-resultant signal IQm into the demodulation-resultant in-phase signal "I" and the demodulation-resultant quadrature signal "Q".

What is claimed is:

1. An ultrasound diagnostic apparatus comprising:
  a probe outputting RF signals;
  N phase detectors for converting the RF signals outputted from the probe into baseband signals In and Qn, where "N" denotes a first predetermined natural number and "n" denotes a second predetermined natural number set as $2 \leq n \leq N$; and
  a reception beam former for processing the baseband signals In and Qn into a time-division-multiplexed signal;
  wherein the reception beam former comprises means for multiplying the baseband signals In and Qn by phase shift data to generate multiplication-resultant signals, means for delaying the multiplication-resultant signals to generate delay-resultant signals;
  and means for combining the delay-resultant signals into the time-division-multiplexed signal.

2. An ultrasound diagnostic apparatus as recited in claim 1, further comprising means for selecting either a set of the RF signals or a set of the baseband signals In and Qn, and feeding the selected signal set to the reception beam former.

3. An ultrasound diagnostic apparatus as recited in claim 2, wherein the multiplying means in the reception beam former comprises multipliers for multiplying the baseband signals In and Qn by the phase shift data, and the multipliers are operative for multiplying the RF signals by weighting factors when the set of the RF signals is fed to the reception beam former.

4. An ultrasound diagnostic apparatus as recited in claim 1, further comprising a demodulation phase detector for subjecting the time-division-multiplexed signal to a demodulation process.

5. An ultrasound diagnostic apparatus as recited in claim 4, wherein the demodulation phase detector comprises means for demultiplexing the time-division-multiplexed signal.

6. An ultrasound diagnostic apparatus as recited in claim 1, wherein the delaying means comprises means for delaying the multiplication-resultant signals by fixed time intervals.

7. An ultrasound diagnostic apparatus comprising:
  a first transducer element (P1) outputting a first RF signal;
  a second transducer element (P2) outputting a second RF signal;
  a third transducer element (P3) outputting a third RF signal;
  first means (12) for demodulating the third RF signal into a baseband in-phase signal and a baseband quadrature signal;
  a first multiplier (M5);
  a second multiplier (M6);
  an adder (A1) connected to the first and second multipliers (M5, M6) for adding an output signal from the first multiplier (M5) and an output signal from the second multiplier (M6);
  second means (SW1, SW2) for selecting either a set of the first and second RF signals or a set of the baseband in-phase and quadrature signals, for feeding the first and second RF signals to the first and second multipliers (M5, M6) respectively when the set of the first and second RF signals is selected, and for feeding the baseband in-phase and quadrature signals to the first and second multipliers (M5, M6) respectively when the set of the baseband in-phase and quadrature signals is selected;
  third means (W1, W2) for feeding first and second weighting factors to the first and second multipliers (M5, M6) respectively when the second means (SW1, SW2) selects the set of the first and second RF signals; and fourth means (5) for feeding first and second phase shift signals to the first and second multipliers (M5, M6) respectively when the second means (SW1, SW2) selects the set of the baseband in-phase and quadrature signals;

wherein the first multiplier (M5) multiplies the first RF signal and the first weighting factor and the second multiplier (M6) multiplies the second RF signal and the second weighting factor when the second means (SW1, SW2) selects the set of the first and second RF signals; and wherein the first multiplier (M5) multiplies the baseband in-phase signal and the first phase shift signal and the second multiplier (M6) multiplies the baseband quadrature signal and the second phase shift signal when the second means (SW1, SW2) selects the set of the baseband in-phase and quadrature signals.

8. An ultrasound diagnostic apparatus as recited in claim 7, further comprising fifth means (6, 7) for demodulating an output signal from the adder (A1) into a demodulation-resultant in-phase signal and a demodulation-resultant quadrature signal when the second means (SW1, SW2) selects the set of the first and second RF signals, and for demultiplexing the output signal from the adder (A1) into a demultiplexing-resultant in-phase signal and a demultiplexing-resultant quadrature signal when the second means (SW1, SW2) selects the set of the baseband in-phase and quadrature signals.

9. An ultrasound diagnostic apparatus as recited in claim 8, wherein the fifth means (6, 7) comprises:

a multiplier generator (7) for generating first and second multiplier signals;

a third multiplier (M9) for multiplying the output signal from the adder (A1) and the first multiplier signal, wherein an output signal of the third multiplier (M9) is the demodulation-resultant in-phase signal when the second means (SW1, SW2) selects the set of the first and second RF signals, and the output signal of the third multiplier (M9) is the demultiplexing-resultant in-phase signal when the second means (SW1, SW2) selects the set of the baseband in-phase and quadrature signals; and a fourth multiplier (M10) for multiplying the output signal from the adder (A1) and the second multiplier signal, wherein an output signal of the fourth multiplier (M10) is the demodulation-resultant quadrature signal when the second means (SW1, SW2) selects the set of the first and second RF signals, and the output signal of the fourth multiplier (M10) is the demultiplexing-resultant quadrature signal when the second means (SW1, SW2) selects the set of the baseband in-phase and quadrature signals.

10. An ultrasound diagnostic apparatus comprising:

a probe outputting RF signals;

N phase detectors for converting the RF signals outputted from the probe into baseband signals In and Qn, where "N" denotes a first predetermined natural number and "n" denotes a second predetermined natural number set as $2 \leq n \leq N$;

means for selecting either a set of the RF signals or a set of the baseband signals In and Qn as a set of selection-result signals;

a reception beam former for processing the selection-result signals into a time-division-multiplexed signal;

means for feeding phase shift data to the reception beam former as control data when the selecting means selects the set of the baseband signals In and Qn; and means for feeding weighting factors to the reception beam former as the control data when the selecting means selects the set of the RF signals;

wherein the reception beam former comprises means for multiplying the selection-result signals by the control data to generate multiplication-resultant signals, means for delaying the multiplication-resultant signals to generate delay-resultant signals, and means for combining the delay-resultant signals into the time-division-multiplexed signal.

11. An ultrasound diagnostic apparatus as recited in claim 10, further comprising a demodulation phase detector for subjecting the time-division-multiplexed signal to a demodulation process.

12. An ultrasound diagnostic apparatus as recited in claim 11, wherein the demodulation phase detector comprises means for demultiplexing the time-division-multiplexed signal.

13. An ultrasound diagnostic apparatus as recited in claim 10, wherein the delaying means comprises means for delaying the multiplication-resultant signals by fixed time Intervals.

* * * * *